United States Patent
Relyea (10) Patent No.: US 8,787,566 B2
(45) Date of Patent: Jul. 22, 2014

(54) STRONG ENCRYPTION

(75) Inventor: Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1390 days.

(21) Appl. No.: 11/466,763

(22) Filed: Aug. 23, 2006

(65) Prior Publication Data

US 2008/0069341 A1    Mar. 20, 2008

(51) Int. Cl.
*H04L 9/30* (2006.01)

(52) U.S. Cl.
USPC .......... 380/30; 380/28; 380/29; 380/44; 380/285; 713/150; 713/168; 713/171

(58) Field of Classification Search
USPC .......... 380/28–30, 284–285, 44; 713/150, 713/168–171
See application file for complete search history.

(56) References Cited

U.S. PATENT DOCUMENTS

| | | | |
|---|---|---|---|
| 4,108,367 A | 8/1978 | Hannan | |
| 4,849,614 A | 7/1989 | Watanabe et al. | |
| 4,924,330 A | 5/1990 | Seamons et al. | |
| 5,247,163 A | 9/1993 | Ohno et al. | |
| 5,594,227 A | 1/1997 | Deo | |
| 5,631,961 A | 5/1997 | Mills et al. | |
| 5,666,415 A | 9/1997 | Kaufman | |
| 5,721,781 A | 2/1998 | Deo et al. | |
| 5,745,576 A | 4/1998 | Abraham et al. | |
| 5,745,678 A | 4/1998 | Herzberg et al. | |
| 5,768,373 A * | 6/1998 | Lohstroh et al. | 380/286 |
| 5,862,310 A | 1/1999 | Crawford et al. | |
| 5,923,884 A | 7/1999 | Peyret et al. | |
| 5,937,066 A * | 8/1999 | Gennaro et al. | 380/286 |
| 5,943,423 A | 8/1999 | Muftic | |
| 5,991,411 A | 11/1999 | Kaufman et al. | |
| 5,991,882 A | 11/1999 | O'Connell | |
| 6,005,942 A | 12/1999 | Chan et al. | |
| 6,005,945 A | 12/1999 | Whitehouse | |
| 6,011,847 A * | 1/2000 | Follendore, III | 713/160 |
| 6,016,476 A | 1/2000 | Maes et al. | |
| 6,044,155 A * | 3/2000 | Thomlinson et al. | 713/155 |
| 6,072,876 A * | 6/2000 | Obata et al. | 380/286 |
| 6,141,420 A | 10/2000 | Vanstone et al. | |

(Continued)

FOREIGN PATENT DOCUMENTS

| | | |
|---|---|---|
| WO | 9724831 | 7/1997 |
| WO | 0048064 A1 | 8/2000 |
| WO | 2007096590 A1 | 8/2007 |

OTHER PUBLICATIONS

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.*

(Continued)

*Primary Examiner* — Yin-Chen Shaw
(74) *Attorney, Agent, or Firm* — Lowenstein Sandler LLP (57) ABSTRACT

An embodiment generally relates to a method of strong encryption. The method includes generating a first cryptographic key based on a random number and generating a second cryptographic key based on a password. The method also includes encrypting private data with the first cryptographic key to arrive at wrapped private data and encrypting the first cryptographic key with the second cryptographic key to arrive at a wrapped first cryptographic key.

14 Claims, 5 Drawing Sheets

(56) References Cited

U.S. PATENT DOCUMENTS

| | | |
|---|---|---|
| 6,178,507 B1 | 1/2001 | Vanstone |
| 6,179,205 B1 | 1/2001 | Sloan |
| 6,226,744 B1 | 5/2001 | Murphy et al. |
| 6,377,825 B1 | 4/2002 | Kennedy et al. |
| 6,490,680 B1 | 12/2002 | Scheidt et al. |
| 6,502,108 B1 | 12/2002 | Day et al. |
| 6,539,093 B1 | 3/2003 | Asad et al. |
| 6,636,975 B1 | 10/2003 | Khidekel et al. |
| 6,643,701 B1 | 11/2003 | Aziz et al. |
| 6,687,190 B2 | 2/2004 | Momich et al. |
| 6,691,137 B1 | 2/2004 | Kishi |
| 6,698,654 B1 | 3/2004 | Zuppicich |
| 6,734,886 B1 | 5/2004 | Hagan et al. |
| 6,760,752 B1 | 7/2004 | Liu et al. |
| 6,804,687 B2 | 10/2004 | Sampson |
| 6,819,766 B1 * | 11/2004 | Weidong ............... 380/277 |
| 6,826,686 B1 | 11/2004 | Peyravian |
| 6,829,712 B1 | 12/2004 | Madoukh |
| 6,880,037 B2 | 4/2005 | Boyer |
| 6,880,084 B1 | 4/2005 | Brittenham et al. |
| 6,898,605 B2 | 5/2005 | Constantino |
| 6,898,714 B1 | 5/2005 | Nadalin et al. |
| 6,931,133 B2 | 8/2005 | Andrews et al. |
| 6,941,326 B2 | 9/2005 | Kadyk et al. |
| 6,956,950 B2 * | 10/2005 | Kausik ............... 380/277 |
| 6,970,562 B2 * | 11/2005 | Sandhu et al. ............... 380/30 |
| 6,970,970 B2 | 11/2005 | Jung et al. |
| 6,978,933 B2 | 12/2005 | Yap et al. |
| 6,986,040 B1 | 1/2006 | Kramer et al. |
| 7,007,105 B1 | 2/2006 | Sullivan et al. |
| 7,010,600 B1 | 3/2006 | Prasad et al. |
| 7,050,589 B2 | 5/2006 | Kwan |
| 7,051,213 B1 * | 5/2006 | Kobayashi et al. ........... 713/194 |
| 7,085,386 B2 | 8/2006 | Audebert et al. |
| 7,114,028 B1 | 9/2006 | Green et al. |
| 7,156,302 B2 | 1/2007 | Yap et al. |
| 7,159,763 B2 | 1/2007 | Yap et al. |
| 7,185,018 B2 | 2/2007 | Archbold et al. |
| 7,251,728 B2 | 7/2007 | Toh et al. |
| 7,278,581 B2 | 10/2007 | Ong |
| 7,299,364 B2 | 11/2007 | Noble et al. |
| 7,302,585 B1 | 11/2007 | Proudler et al. |
| 7,356,688 B1 * | 4/2008 | Wang ............... 713/153 |
| 7,374,099 B2 | 5/2008 | de Jong |
| 7,386,705 B2 | 6/2008 | Low et al. |
| 7,437,757 B2 | 10/2008 | Holdsworth |
| 7,451,921 B2 | 11/2008 | Dowling et al. |
| 7,475,250 B2 | 1/2009 | Aull et al. |
| 7,475,256 B2 | 1/2009 | Cook |
| 7,480,384 B2 | 1/2009 | Peyravian et al. |
| 7,502,793 B2 | 3/2009 | Snible et al. |
| 7,512,800 B2 * | 3/2009 | Hopkins ............... 713/172 |
| 7,529,374 B2 * | 5/2009 | Huttunen ............... 380/277 |
| 7,571,321 B2 | 8/2009 | Appenzeller et al. |
| 7,602,910 B2 * | 10/2009 | Johansson et al. ............... 380/44 |
| 7,702,917 B2 | 4/2010 | Tevosyan et al. |
| 7,769,996 B2 | 8/2010 | Randle et al. |
| 7,822,209 B2 | 10/2010 | Fu et al. |
| 7,860,243 B2 * | 12/2010 | Zheng et al. ............... 380/30 |
| 2001/0008012 A1 * | 7/2001 | Kausik ............... 713/156 |
| 2001/0036276 A1 | 11/2001 | Ober et al. |
| 2001/0054148 A1 | 12/2001 | Hoornaert et al. |
| 2002/0004816 A1 | 1/2002 | Vange et al. |
| 2002/0007351 A1 | 1/2002 | Hillegass et al. |
| 2002/0010679 A1 | 1/2002 | Felsher |
| 2002/0029343 A1 | 3/2002 | Kurita |
| 2002/0056044 A1 | 5/2002 | Andersson |
| 2002/0059144 A1 | 5/2002 | Meffert et al. |
| 2002/0064095 A1 | 5/2002 | Momich et al. |
| 2002/0080958 A1 * | 6/2002 | Ober et al. ............... 380/44 |
| 2002/0099727 A1 | 7/2002 | Kadyk et al. |
| 2002/0112156 A1 | 8/2002 | Gien et al. |
| 2002/0133707 A1 | 9/2002 | Newcombe |
| 2002/0171546 A1 | 11/2002 | Evans et al. |
| 2002/0184149 A1 | 12/2002 | Jones |
| 2002/0188848 A1 | 12/2002 | Buttiker |
| 2003/0005291 A1 | 1/2003 | Burn |
| 2003/0012386 A1 | 1/2003 | Kim et al. |
| 2003/0028664 A1 | 2/2003 | Tan et al. |
| 2003/0035548 A1 | 2/2003 | Kwan |
| 2003/0056099 A1 | 3/2003 | Asanoma et al. |
| 2003/0075610 A1 | 4/2003 | Ong |
| 2003/0093695 A1 | 5/2003 | Dutta |
| 2003/0115455 A1 | 6/2003 | Aull et al. |
| 2003/0115466 A1 | 6/2003 | Aull et al. |
| 2003/0115467 A1 | 6/2003 | Aull et al. |
| 2003/0115468 A1 | 6/2003 | Aull et al. |
| 2003/0167399 A1 | 9/2003 | Audebert et al. |
| 2003/0172034 A1 | 9/2003 | Schneck et al. |
| 2004/0042620 A1 | 3/2004 | Andrews et al. |
| 2004/0053642 A1 | 3/2004 | Sandberg et al. |
| 2004/0066274 A1 | 4/2004 | Bailey |
| 2004/0088562 A1 | 5/2004 | Vassilev et al. |
| 2004/0096055 A1 | 5/2004 | Williams et al. |
| 2004/0103324 A1 | 5/2004 | Band |
| 2004/0103325 A1 | 5/2004 | Priebatsch |
| 2004/0120525 A1 | 6/2004 | Miskimmin et al. |
| 2004/0144840 A1 | 7/2004 | Lee et al. |
| 2004/0146163 A1 | 7/2004 | Asokan et al. |
| 2004/0153451 A1 | 8/2004 | Phillips et al. |
| 2004/0162786 A1 | 8/2004 | Cross et al. |
| 2004/0230831 A1 | 11/2004 | Spelman et al. |
| 2005/0022123 A1 | 1/2005 | Costantino |
| 2005/0033703 A1 | 2/2005 | Holdsworth |
| 2005/0109841 A1 | 5/2005 | Ryan et al. |
| 2005/0114673 A1 | 5/2005 | Raikar et al. |
| 2005/0123142 A1 | 6/2005 | Freeman et al. |
| 2005/0138386 A1 | 6/2005 | Le Saint |
| 2005/0138390 A1 | 6/2005 | Adams et al. |
| 2005/0144312 A1 | 6/2005 | Kadyk et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0199978 A1 | 9/2005 | Takayama |
| 2005/0216732 A1 | 9/2005 | Kipnis et al. |
| 2005/0262361 A1 | 11/2005 | Thibadeau |
| 2005/0279827 A1 | 12/2005 | Mascavage et al. |
| 2005/0289652 A1 | 12/2005 | Sharma et al. |
| 2006/0005028 A1 | 1/2006 | Labaton |
| 2006/0010325 A1 | 1/2006 | Liu et al. |
| 2006/0015933 A1 | 1/2006 | Ballinger et al. |
| 2006/0036868 A1 | 2/2006 | Cicchitto |
| 2006/0043164 A1 | 3/2006 | Dowling et al. |
| 2006/0072747 A1 | 4/2006 | Wood et al. |
| 2006/0073812 A1 | 4/2006 | Punaganti Venkata et al. |
| 2006/0075133 A1 | 4/2006 | Kakivaya et al. |
| 2006/0075486 A1 | 4/2006 | Lin et al. |
| 2006/0101111 A1 | 5/2006 | Bouse et al. |
| 2006/0101506 A1 | 5/2006 | Gallo et al. |
| 2006/0173848 A1 | 8/2006 | Peterson et al. |
| 2006/0174104 A1 | 8/2006 | Crichton et al. |
| 2006/0206932 A1 | 9/2006 | Chong |
| 2006/0208066 A1 | 9/2006 | Finn et al. |
| 2006/0226243 A1 | 10/2006 | Dariel |
| 2006/0291664 A1 | 12/2006 | Suarez et al. |
| 2006/0294583 A1 | 12/2006 | Cowburn et al. |
| 2007/0014416 A1 * | 1/2007 | Rivera et al. ............... 380/286 |
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 | 7/2007 | Frank et al. |
| 2007/0189534 A1 | 8/2007 | Wood et al. |
| 2007/0204333 A1 | 8/2007 | Lear et al. |
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |

(56) References Cited

U.S. PATENT DOCUMENTS

| | | |
|---|---|---|
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0072283 A1 | 3/2008 | Relyea |
| 2008/0077794 A1 | 3/2008 | Arnold et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

OTHER PUBLICATIONS

Bellovin et al., "Augmented Encrypted Key Exchange: a Password-Based Protocol Secure Against Dictionary Attacks and Password File Compromise", $1^{st}$ Conference of Computer & Comm. Security, 1993, p. 244-250.*

ATM and Credit Card Notification, Feb. 2005 (internet archive) pp. 1-2, www.thereareplaces.com/infgdes/money.atmnotif.htm.

AMD Announces Specification for Open Platform Management Architecture, Feb. 28, 2005, pp. 1-2, http://www.thefreelibrary.com/AMD+Announces+Specification+for+Open+Platform+Management+Architecture-a0129342307.

Cryptographic Message Syntax, R. Housley, Request for Comments (RFC) 2630, Network Working Group, The Internet Society, Jun. 1999.

Schneier, "Applied Cryptography: Protocols, Algorithms, and Source Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS#11 v2.20: Cryptographic Token Interface Standard, RSA Laboratories, Jun. 28, 2004 (see, e.g. Chapter 10, Objects) (see www.rsasecurity.com, 407 pages).

Schneier Bruce. Applied Cryptography, Second Edition. 1996 John Wiley and Sons, pp. 480-481.

* cited by examiner

STRONG ENCRYPTION

FIELD

This invention relates generally to secure computing systems, more particularly for methods and systems for increasing the level of security provided by strong encryption.

DESCRIPTION OF THE RELATED ART

Software based encryption systems (like Network Security Services) need to be able to store keys is a secure manner. Conventional systems typically rely on a combination of an operating system file system protections and encryption with a key generated by a user's password.

Although the conventional systems are able to provide a certain level or protections, they are still vulnerable to attacks. For example, the networked data in a system is often not stored with a strong security scheme. Accordingly, access to stored encrypted keys can be relatively achieved, which leads to other problems.

With the encrypted key data, a dictionary attack can be mounted against the key generated from the user's password. A dictionary attack is a form of an attack in which an attacker uses a large set of likely combinations to guess the key. Hardware based system defeat dictionary attacks by limiting access to the 'key oracle' (a function or operation that indicates whether or not a given password is correct) by either locking after a certain number of failed password checks, or by limiting the rate at which password checks can be performed. Accordingly, there is a need in the art for system that can increase the level of security for stored encrypted keys as well as limiting the rate of password checks.

SUMMARY

An embodiment generally relates to a method of strong encryption. The method includes generating a first cryptographic key based on a random number and generating a second cryptographic key based on a password. The method also includes encrypting private data with the first cryptographic key to arrive at wrapped private data and encrypting the first cryptographic key with the second cryptographic key to arrive at a wrapped first cryptographic key.

Another embodiment pertains generally to a method of strong encryption. The method includes generating a first cryptographic key based on a time-expanding function and generating a second cryptographic key based on a password. The method also includes encrypting private data with the first cryptographic key to arrive at wrapped private data and encrypting the first cryptographic key with the second cryptographic key to arrive at a wrapped first cryptographic key.

Yet another embodiment relates generally to a system for strong encryption of data. The system includes a server configured to execute a token management system, where the token management system is configured to generate and manage cryptographic keys. The system also includes at least one client configured to couple with the server and a security client configured to be executed on the at least one client. The security client is configured to generate a first cryptographic key and generate a second cryptographic key based on a password. The security client is also configured to encrypt private data with the first cryptographic key to arrive at wrapped private data and encrypt the first cryptographic key with the second cryptographic key to arrive at a wrapped first cryptographic key.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of secure computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods, systems and apparatus for increasing security in multi-user systems. More particularly, a strong password module may be configured to generate two cryptographic keys. The first cryptographic key is generated from a random number, which will be referred to as Ks. The second cryptographic key is generated based on a user's password (password based encryption). The second key can be referred as Kpbe. A user's sensitive data, e.g., private keys, may be encrypted or wrapped with Ks, i.e., Ks(SPrivK). The Ks key is then wrapped by Kpbe, Kpbe(Ks), and stored separately.

The security for the private keys, SPrivK, or other sensitive data, is substantially increased. The attacker may not be able to break the encryption of the private keys because Ks is based on a random value and breaking Ks would be equivalent to breaking the cipher. Moreover, the attacker cannot determine Ks from the wrapped Kpbe(Ks). More specifically, even if the attacker can break Kpbe, the attacker cannot tell if he has Ks, since Ks will appear as a random set of bits. Accordingly, the attack needs both Kpbe(Ks) and the Ks(SPrivK). The attacker must both decrypt Ks and then apply the alleged decrypted Ks to the encrypted private keys. Thus, the attacker is forced to take two steps in his attack and expend additional computing time and resources on each attempt. This mode of security is applicable to situations where Kpbe(Ks) and the Ks(SPrivK) are kept separate.

As an additional deterrent against attacks, a time expanding function can be applied to force the attacker to expend additional computing time and resources. More particularly, a time expanding function may be applied to the first cryptographic key, Ks. For example, one time expanding function may be $Ks=g^e \bmod p$, where g can be a generator over a prime number field, p. The user may select p to determine the length of the time to generate Ks. The security characteristics of $g^e \bmod p$ are well known in the PKI arena. It forms the basis for a number of security algorithms, including DSA, Diffie-Hellman, and El Gamal. The exponent, e, is selected at random and, in some embodiments, encrypted by Kpbe. Thus, Ks key may be generated in a user-specified length of time.

Time expanding functions are known to those skilled in the art. Hashing functions are another known time expanding functions. For these embodiments, the selected time-expanding function may be required to have the following characteristics: (1) the time it takes to resolve a value of the function must be parameterizable (i.e., based on the size of p); (2) the function must take some seed value that can be completely random (RSA exponents, for instance, would not be applicable) or the attacker could simply decrypt the seed looking for it's unique numeric characteristics; and (3) the seed must be fully involved in the expense of the operation. More particularly, creating random mask M, encrypting M with Kpbe, then encrypting Ks XOR M with an RSA operation would not work as the attacker would only have to do the RSA operation once and then try his decrypted results with his variously calculated exclusive-OR masks against the results.

As a result, since the time to generate $Ks=g^e \bmod p$ is exponentially proportional to p, the length of time to validate a password can be selected. The attacker is then forced to make a password attempt on e, perform the time expander function to obtain a trial Ks, then attempt to crack the wrapped user data, i.e., Ks(SPrivK). The length of time to generate Ks is arbitrarily long and can be as time consuming as system administration desires. Thus, the time in generating Ks, checking the Ks against the secured user data, and checking the user file may stymie potential attacks.

Figure 1:
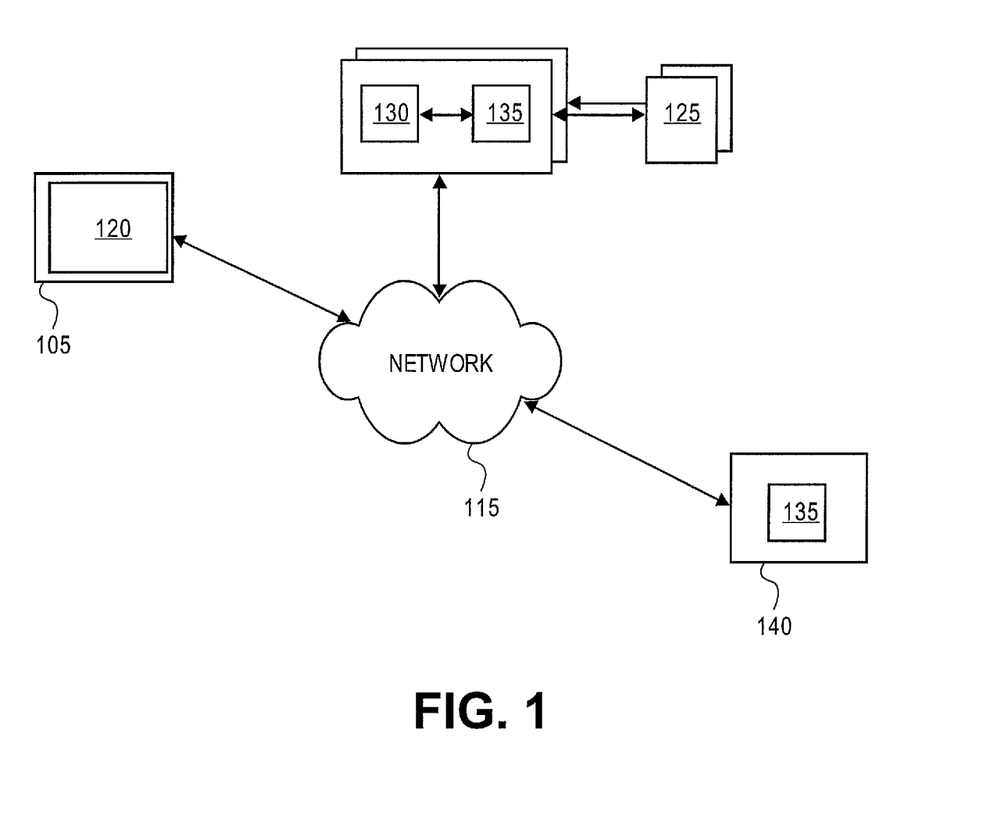
FIG. 1 illustrates an exemplary system in accordance with an embodiment.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a certificate management system 120 through a multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands. The server 105 may also have applications/data 120 accessible to the clients 110.

The clients 110 may be computing machine or platform configured to execute secure and open applications through the multi-user operating system. The clients 110 may be implemented with personal computers, workstations, thin clients, thick clients, or other similar computing platform. The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token, such as a smart card, to access the respective client 110 through the security device 125. Each client 110 may have a security client 130 executing to monitor the security device 125.

The security client 130 may be configured to manage the token. More specifically, the security client 130 may provide an interface for a user to obtain and manage cryptographic keys, obtain status of the token, and enter authentication information.

The security client 130 may also interface with a strong key module 135. The strong key module 135 may be configured to offer at least two modes of security for personal or private data. More particularly, the strong key module 135 may generate a first cryptographic key, Ks, based on a random number and a second cryptographic key, Kpbe, based on a user's password. The strong key module 135 may encrypt user's private data, e.g., private keys, or any other personal data with the first cryptographic key, Ks, to arrive at wrapped private data, Ks(SPrivK). The strong key module 135 may also the first cryptographic key, Ks, with the second cryptographic key, Kpbe, to arrived at wrapped first cryptographic key, Kpbe(Ks). The wrapped first cryptographic key, Kpbe(Ks) may then stored in a separated protected locations. Protected storage location may be created in server 105, server 140, client 110 and/or the token.

Accordingly, an attacker may not be able to break the encryption of the private keys because the first cryptographic key, Ks, is based on a random value and breaking the first cryptographic key, Ks, would be equivalent to breaking the cipher. Moreover, the attacker cannot determine the first cryptographic key, Ks, from the wrapped first cryptographic key, Kpbe(Ks). More specifically, even if the attacker can break the second cryptographic key, Kpbe, the attacker cannot tell if he has the first cryptographic key, Ks, since Ks will appear as a random set of bits. Accordingly, the attack needs both Kpbe (Ks) and the Ks(SPrivK). The attacker must both decrypt Ks and then apply the alleged decrypted Ks to the encrypted private keys. Thus, the attacker is forced to take two steps in his attack and expend additional computing time and resources on each attempt.

The strong key module 135 may also offer a second mode of security. In the event that an attacker has obtained both wrapped cryptographic keys or for additional security than the first mode, the strong key module 135 may be configured to may generate the first cryptographic key, Ks, based on a time-expanding function. For example, one time expanding function may be $Ks=g^e \bmod p$, where g can be a generator over a prime number field, p. The exponent, e, is a random number. In yet other embodiments, the exponent, e, may be encrypted with Kpbe. Accordingly, the time expanding function can be applied to force the attacker to expend additional computing time and resources because the time to generate $Ks=g^e \bmod p$ is exponentially proportional to p, the length of time to validate a password can be selected. The attacker is then forced to make a password attempt on e, perform the time expander function to obtain a trial Ks, then attempt to crack the wrapped user data, i.e., Ks(SPrivK). The length of time to generate Ks is arbitrarily long and can be as time consuming as system administration desires. Moreover, the length of time penalty may permit the storage of the Kpbe(Ks) and Ks(SPrivK) in a single location.

Although the strong key module 135 may execute within a client 110, the strong key module 135 may also execute in a server 140, which is coupled to the network 115 as known to those skilled in the art.

Figure 2:
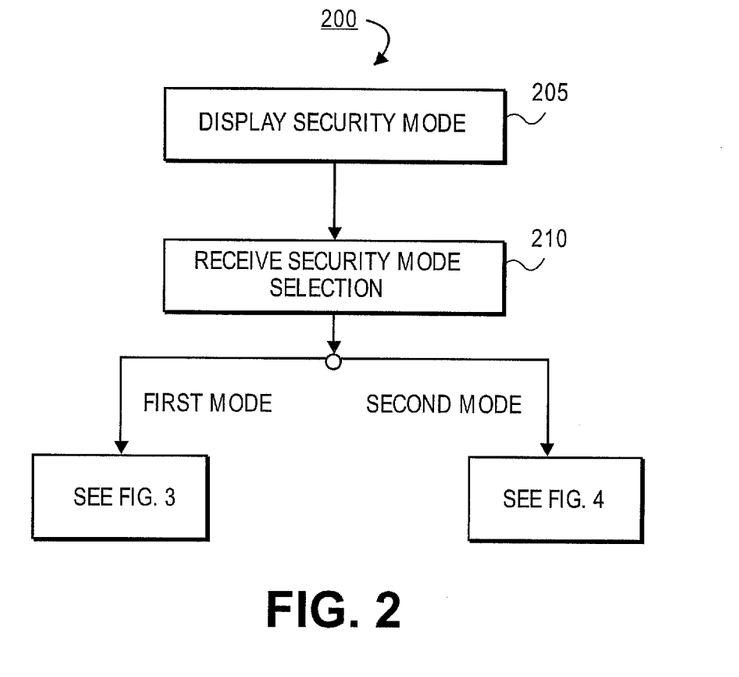
FIG. 2 illustrates an exemplary flow diagram executed by the token management system in accordance with yet another embodiment.

FIG. 2 illustrates a flow diagram 200 implemented by the strong key module 135 in accordance with an embodiment of the invention. It should be readily apparent to those of ordinary skill in the art that the flow diagram 200 depicted in FIG. 2 represents a generalized schematic illustration and that other steps may be added or existing steps may be removed or modified.

As shown in FIG. 2, the strong key module 135 may be configured to display a user interface in response to the insertion of an unformatted or un-enrolled token, e.g., a smart card, in step 205. The user interface may include a menu option that allows a user to select between several modes of security: a first mode and a second mode. If a user selects the first mode, the strong key module 135 may implement the flow diagram 300 shown in FIG. 3. If a user selects the second mode, the security client 130 may implement the flow diagram 400 shown in FIG. 4.

Figure 3:
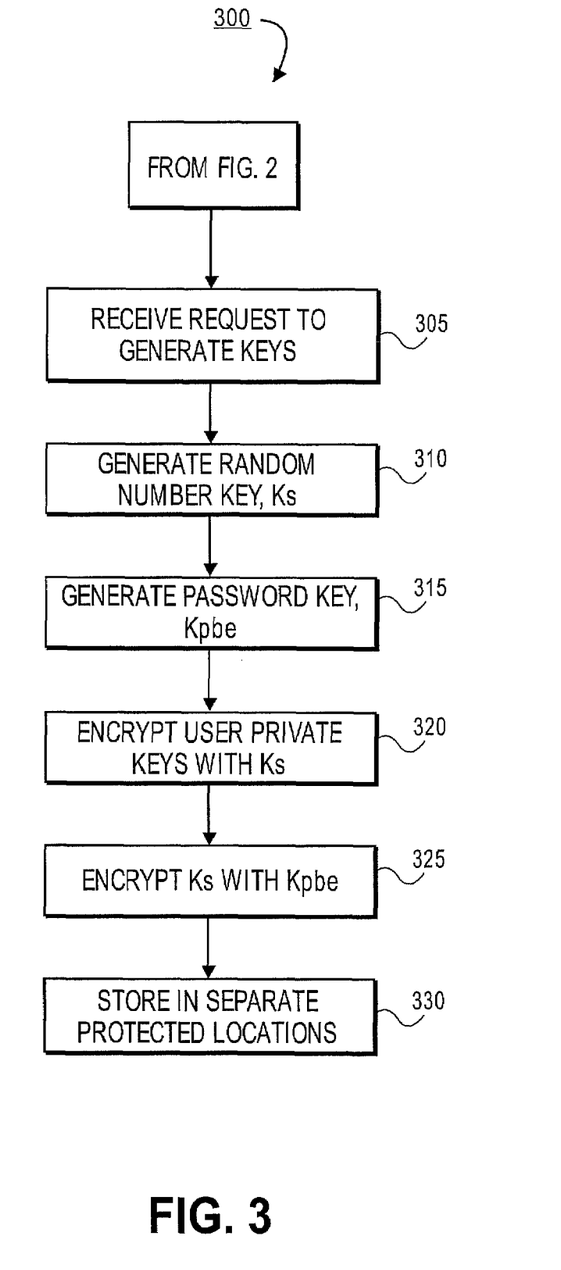
FIG. 3 illustrates another exemplary flow diagram executed by the token management system in accordance with yet another embodiment.

Referring to FIG. 3, if the user selects the first security mode, the strong key module 135 may receive a request to generate cryptographic keys, in step 305. In step 310, the strong key module 135 may be configured to generate a random number cryptographic key, Ks, based on a random number. The random number can be achieved with a random number generator or other similar techniques known to those skilled in the art. In step 315, the strong key module 135 may generate a password cryptographic key, Kpbe, based on the password of the user. The password may be passed to the strong key module 135 by the security client or the strong key module 135 may query the security client 130 for the password. The techniques for generating cryptographic keys are also known to those skilled in the art In step 320, the strong key module 135 may wrap or encrypt the user's private data, e.g., private keys (SprivKs), confidential information, etc., with the random number cryptographic key, Ks. The strong key module 135 may request access to the private data or may be provided with the private data. The encrypted private data, Ks(SPrivK) may be stored in the token or in a protected location in the client 110 or token.

In step 325, the strong key module 135 may be configured to wrap or encrypt the first cryptographic key, Ks, with the password cryptographic key, Kpbe, to arrive a wrapped random number key, Kbpe(Ks). The strong key module 135 may then store the wrapped random number key, Kpbe(Ks) in a protected location in server 105 or server 140 as specified by a system administrator, in step 330.

Figure 4:
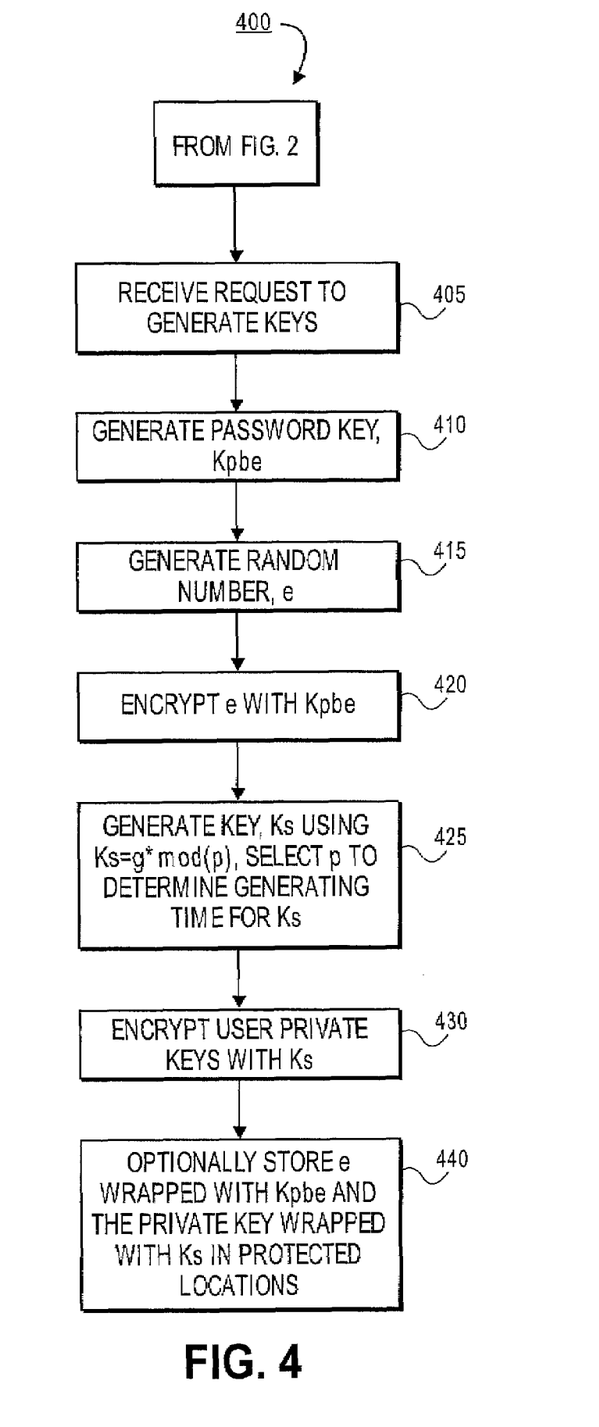
FIG. 4 illustrates yet another exemplary flow diagram executed by the token management system in accordance with yet another embodiment.

To further increase the time expended by an attacker, the second mode may be initiated as shown in FIG. 4. With reference to FIG. 4, the strong key module 135 may receive a request to generate cryptographic keys, in step 405. In step 410, the strong key module 135 may be configured to generate a password cryptographic key, Kpbe, based on the password of the user. The techniques for generating cryptographic keys are also known to those skilled in the art.

In step 415, the strong key module 135 may be configured to generate a random number, e. The random number may be generated with a random number generator or retrieved from an application service from a server. In step 420, the strong key module 135 may encrypt the random number, e, with the password based cryptographic key, Kpbe.

In step 425, the strong key module 135 may be configured to generate a cryptographic key, Ks, based on the encrypted e and p is selected to specify the length of time for generating Ks.

In step 430, the strong key module 135 may encrypt the user private data, e.g., SPrivK, with the random number cryptographic key to arrive at wrapped private data Ks(SPrivK).

In step 435, the strong key module 135 may optionally store or at the discretion of the user random number, e, encrypted with password-based cryptographic key, Kpbe, i.e., Kpbe(e), and the wrapped private data, Ks(SPrivK) in separate protected locations.

The use of the time expanding function may permit the wrapped keys (Kpbe(s) and Ks(SPrivK) to be store in a single location. This is a result of the time penalty caused by the time-expanding function. More specifically, the potential attacker will still have to apply a two step process as described above to determine whether or not he has broken the keys (most unlikely). The potential attacker also has to incur additional time for the generation of an attempt at the random number cryptographic key, Ks.

Figure 5:
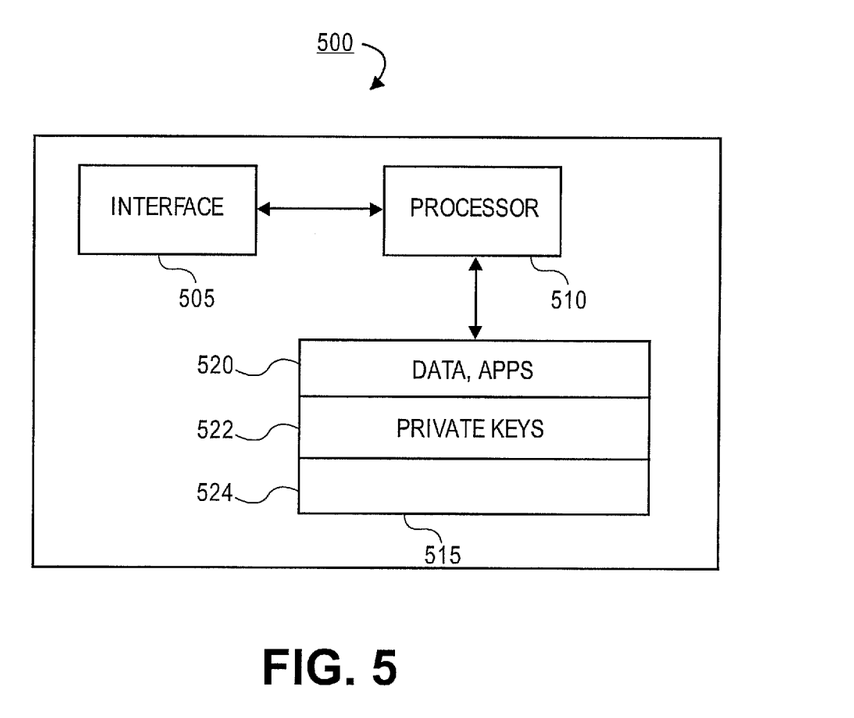
FIG. 5 illustrates an exemplary token in accordance with yet another embodiment.

FIG. 5 illustrates an exemplary token 500 in accordance with yet another embodiment. As shown in FIG. 5, the token 500 includes an interface 505, a processor 510, and memory 515. The interface 505, the processor 510 and the memory 515 may be implemented with an application specific integrated circuit, field programmable gate array, or other similar technologies.

The interface 505 may be configured as communication conduit for data between the token and the security client. The interface 505 may comply with existing smart card interface standards such as ISO 7816, which is hereby incorporated by reference. The processor 510 may be configured to provide a computing platform for the functions of the token. For example, the processor 510 can transfer data, execute applets stored in the memory 515. The memory 515 may be configured to securely store information such as private keys, data, applets (small applications). The memory 515 may be partitioned into blocks 520-524. Accordingly, the token 500 may store wrapped private data among other things.

Figure 6:
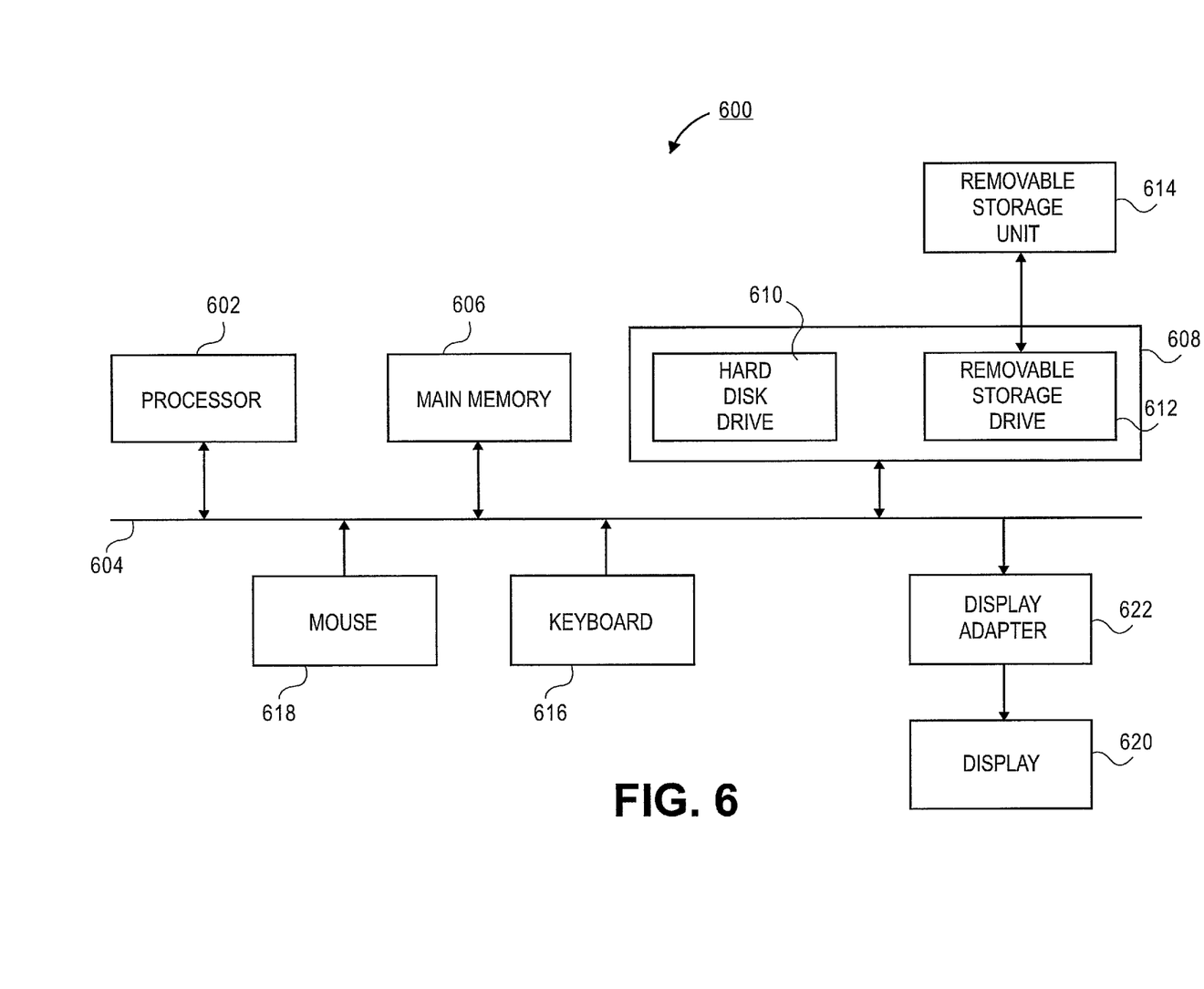
FIG. 6 illustrates an exemplary computing platform in accordance with yet another embodiment.

FIG. 6 illustrates an exemplary block diagram of a computing platform 600 where an embodiment may be practiced. The functions of the security client and strong key module may be implemented in program code and executed by the computing platform 600. The security client and strong key module may be implemented in computer languages such as PASCAL, C, C++, JAVA, etc.

As shown in FIG. 6, the computer system 600 includes one or more processors, such as processor 602 that provide an execution platform for embodiments of the security client and strong key module. Commands and data from the processor 602 are communicated over a communication bus 604. The computer system 600 also includes a main memory 606, such as a Random Access Memory (RAM), where the security client and token management system may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the security client and strong key module may be stored. The removable storage drive 612 reads from and/or writes to a removable storage unit 614 in a well-known manner. A user interfaces with the security client and strong key module with a keyboard 616, a mouse 618, and a display 620. A display adapter 622 interfaces with the communication bus 604 and the display 620. The display adapter also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   providing, by a processing device, a user interface in response to receiving a token;
   receiving a user selection of one of a plurality of security modes via the user interface;
   in response to a user selection of a first security mode, generating a first cryptographic key based on a pseudo-random number, and a second cryptographic key based on a password of a user;
   encrypting private data of the user with the first cryptographic key to create wrapped private data; and
   encrypting the first cryptographic key with the second cryptographic key to create a wrapped pseudo-random cryptographic key; and
   in response to a user selection of a second security mode, generating a third cryptographic key based on a password of a user;
   generating an exponent;
   encrypting the exponent based on the third cryptographic key;
   generating a fourth cryptographic key based on a time expanding function using the encrypted exponent, wherein the time-expanding function is $g^e$ mod p, g is a generator, e is the encrypted exponent, p is a prime number, and mod is a modulo operator; and
   encrypting private data of the user with the fourth cryptographic key to create wrapped private data,
   wherein in the second security mode, a time to attack the fourth cryptographic key increases with value of p.

2. The method of claim 1, further comprising storing the wrapped private data in a first location and storing the wrapped pseudo-random cryptographic key in a second location.

3. The method of claim 1, wherein the exponent of the time-expanding function is a pseudo-random number.

4. The method of claim 3, wherein an expansion derived by the time-expanding function is selected based on a plurality of parameters.

5. The method of claim 1, wherein the time-expanding function is based on one of digital signature algorithm, El-Gamal encryption algorithm, or Diffie-Hellman.

6. An apparatus comprising:
   a memory to contain instructions; and
   a processor coupled to the memory and to execute the instructions to perform operations comprising:
   providing a user interface in response to receiving a token;
   receiving a user selection of one of a plurality of security modes via the user interface;
   in response to a user selection of a first security mode, generating a first cryptographic key based on a pseudo-random number, and a second cryptographic key based on a password of a user;
   encrypting private data of the user with the first cryptographic key to create wrapped private data; and
   encrypting the first cryptographic key with the second cryptographic key to create a wrapped pseudo-random cryptographic key; and
   in response to a user selection of a second security mode, generating a third cryptographic key based on a password of a user;
   generating an exponent;
   encrypting the exponent based on the third cryptographic key;
   generating a fourth cryptographic key based on a time expanding function using the encrypted exponent, wherein the time-expanding function is $g^e$ mod p, g is a generator, e is the encrypted exponent, p is a prime number, and mod is a modulo operator; and
   encrypting private data of the user with the fourth cryptographic key to create wrapped private data,
   wherein in the second security mode, a time to attack the fourth cryptographic key increases with value of p.

7. A non-transitory computer-readable medium comprising instructions to cause a processing device to perform operations comprising:
   providing, by the processing device, a user interface in response to receiving a token;
   receiving a user selection of one of a plurality of security modes via the user interface;
   in response to a user selection of a first security mode, generating a first cryptographic key based on a pseudo-random number, and a second cryptographic key based on a password of a user;
   encrypting private data of the user with the first cryptographic key to create wrapped private data; and
   encrypting the first cryptographic key with the second cryptographic key to create a wrapped pseudo-random cryptographic key; and
   in response to a user selection of a second security mode, generating a third cryptographic key based on a password of a user;
   generating an exponent;
   encrypting the exponent based on the third cryptographic key;
   generating a fourth cryptographic key based on a time expanding function using the encrypted exponent, wherein the time-expanding function is $g^e$ mod p, g is a generator, e is the encrypted exponent, p is a prime number, and mod is a modulo operator; and encrypting private data of the user with the fourth cryptographic key to create wrapped private data, wherein in the second security mode, a time to attack the fourth cryptographic key increases with value of p.

8. A method comprising:

receiving a private key of a user;

generating, by a processor, a first cryptographic key based on a password of the user;

generating an exponent;

encrypting the exponent based on the first cryptographic key;

generating a second cryptographic key based on a time expanding function using the encrypted exponent, wherein the time-expanding function is $g^e$ mod p, g is a generator, e is the encrypted exponent, p is a prime number, and mod is a modulo operator;

encrypting the private key of the user with the second cryptographic key to create wrapped private key; and storing the encrypted exponent and the wrapped private key in separate protected locations, wherein a time to attack the second cryptographic key increases with value of p.

9. The method of claim 8, wherein an expansion derived by the time-expanding function is selected based on a plurality of parameters.

10. The method of claim 9, wherein the exponent of the time-expanding function is a pseudo-random number.

11. A system comprising:

a server to execute a token management system, the token management system to generate and manage cryptographic keys;

at least one client to couple with the server; and a security client to be executed on the at least one client, wherein the security client is to provide a user interface in response to receiving a token;

receive a user selection of one of a plurality of security modes via the user interface;

in response to a user selection of a first security mode, generate a first cryptographic key based on a pseudo-random number, and a second cryptographic key based on a password of a user, encrypt private data of the user with the first cryptographic key to create wrapped private data, and encrypt the first cryptographic key with the second cryptographic key to create a wrapped pseudo-random cryptographic key, and in response to a user selection of a second security mode, generate a third cryptographic key based on a password of a user, generate an exponent, encrypt the exponent based on the third cryptographic key, generate a fourth cryptographic key based on a time expanding function using the encrypted exponent, wherein the time-expanding function is $g^e$ mod p, g is a generator, e is the encrypted exponent, p is a prime number, and mod is a modulo operator, and encrypt private data of the user with the fourth cryptographic key to create wrapped private data, wherein in the second security mode, a time to attack the fourth cryptographic key increases with value of p.

12. The system of claim 11, wherein the wrapped private data and the wrapped pseudo-random cryptographic key are stored in separate locations in the server.

13. The system of claim 11, wherein the exponent of the time-expanding function is a pseudo-random number.

14. The system of claim 13, wherein an expansion derived by the time-expanding function is selected based on a plurality of parameters.

* * * * *